Patented Oct. 23, 1934

1,977,993

UNITED STATES PATENT OFFICE 1,977,993

PLUMBITE SOLUTIONS

Morris P. Kirk, Los Angeles, Calif., assignor to Morris P. Kirk & Son, Inc., Los Angeles, Calif., a corporation of Nevada No Drawing. Application August 26, 1929, Serial No. 388,424. Renewed December 29, 1932

9 Claims. (Cl. 252—1)

The invention relates to plumbite solutions, more particularly the so-called doctor solutions used for refining petroleum oils. Such solutions are made by dissolving litharge in a 15°–20° Baumé solution of caustic soda in the maximum amount that will be held in solution at the temperature of use. When using pure or ordinary litharge the maximum amount is in the ratio of about 7 grams of litharge to 200 grams of 20° Baumé solution at ordinary working temperatures. According to this invention, the lead concentration obtainable is materially increased and this is accomplished by introducing into the solution a small portion of antimony in the form of antimoniate, which is readily done by using a litharge made from antimonial lead as the raw material. In such case the litharge will contain lead-antimoniate, but the antimony can be otherwise introduced with the same improvement in lead concentration.

Litharge having a suitable proportion of antimoniate can be readily produced out of old battery plates, the grids of which are made of antimonial lead, and such litharge is preferred. The process of producing it is as follows: The plates are first tumbled in a ball mill which batters out of the grids the lead sulfate, peroxide, sponge lead, etc. and also reduces a considerable amount of the antimonial grid lead to a finely divided condition. With water in the mill during the tumbling, a pulp is produced which, after separation from the coarser particles and the parts of the grids is treated with sodium carbonate to convert the lead sulfate to lead carbonate and sodium sulfate according to the familiar reaction. After washing out the sodium sulfate the pulp is then dried or partially dried and roasted at a temperature between 1100° F. and 1260° F. converting the lead carbonate, lead peroxide, metallic lead and antimonial grid metal, etc. to a product consisting mainly of PbO or litharge but containing lead antimoniate and some sodium antimoniate, the antimony being derived from the grid metal. The process is regulated so that the antimoniate is present in the proportion of from 4% to 5% by weight. After grinding this antimonial litharge is dissolved in caustic soda of proper strength to make the doctor solution. The lead antimoniate therein is only difficultly soluble in the caustic solution and much of it remains in suspension in a highly dispersed condition, but the effect of its presence is to increase the amount of litharge that will dissolve or be held in solution under the normal condition of use, for example, whereas 7 grams of pure litharge will be held in 200 grams of a 20° Baumé solution at 20° C. Without crystallizing out, the litharge in the presence of the antimony will be held dissolved therein to the extent of some 14 grams at the same temperature, with corresponding improvement in the efficiency of the doctor solution.

I claim as my invention:

1. A process of producing a litharge containing sufficient lead antimoniate to render it highly efficient in "doctor solution", which comprises: treating material containing lead sulphate, metallic lead, and antimony with sodium carbonate to produce a mixture of lead carbonate, metallic lead, and antimony; and roasting said mixture at a sufficient temperature to produce litharge and lead antimoniate.

2. A process of producing a litharge containing sufficient lead antimoniate to render it highly efficient in "doctor solution", which comprises: treating material containing lead sulphate, metallic lead, and antimony with sodium carbonate to produce a mixture of lead carbonate, metallic lead, and antimony; and roasting said mixture at a sufficient temperature to produce litharge and lead antimoniate, the proportion of antimony in said material being so regulated that the final product resulting from said process contains at least 4% by weight of lead antimoniate.

3. A process of producing a litharge containing sufficient lead antimoniate to render it highly efficient in "doctor solution", which comprises: adding sodium carbonate to a mixture of lead sulphate, metallic lead, and antimony in the presence of water, whereby lead carbonate and sodium sulphate are formed; washing the resultant mixture to remove the sodium sulphate, and roasting said resultant mixture at a temperature between 1100° F. and 1260° F. to produce litharge and lead antimoniate, the proportion of antimony in said material being so regulated that the final product resulting from said process contains approximately 4% by weight of lead antimoniate.

4. A composition of matter adapted for use in "doctor solution", comprising: litharge and lead antimoniate.

5. A composition of matter adapted for use in "doctor solution", comprising: litharge and at least 4% by weight of lead antimoniate.

6. A plumbite solution of high lead concentration containing antimony.

7. A plumbite solution made by dissolving litharge in caustic soda and having the litharge held in solution therein by virtue of the presence of an antimoniate.

8. A plumbite solution of high lead concentration characterized by the presence therein of a lead antimoniate.

9. The method of making plumbite solution which comprises dissolving litharge and a small portion of antimoniate of lead, in a solution of caustic soda.

MORRIS P. KIRK.